(12) United States Patent
Roberts et al.

(10) Patent No.: US 9,742,842 B2
(45) Date of Patent: Aug. 22, 2017

(54) PEER-TO-PEER DATA MIGRATION

(75) Inventors: Michael Roberts, Jamberoo (AU);
Jamie Roberts, Coogee (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 810 days.

(21) Appl. No.: 13/511,134

(22) PCT Filed: Sep. 20, 2011

(86) PCT No.: PCT/US2011/052402
§ 371 (c)(1),
(2), (4) Date: May 21, 2012

(87) PCT Pub. No.: WO2013/043162
PCT Pub. Date: Mar. 28, 2013

(65) Prior Publication Data
US 2013/0073669 A1 Mar. 21, 2013

(51) Int. Cl.
*H04L 29/08* (2006.01)
*G06F 17/30* (2006.01)
(52) U.S. Cl.
CPC .... *H04L 67/1076* (2013.01); *G06F 17/30209* (2013.01); *H04L 29/08306* (2013.01); *H04L 29/08459* (2013.01); *H04L 67/2842* (2013.01); *H04L 67/2852* (2013.01); *H04L 67/2857* (2013.01)
(58) Field of Classification Search
CPC ............ H04L 67/2842; H04L 67/2852; H04L 67/2857; H04L 67/1076; H04L 29/08459; H04L 29/08306; G06F 17/30209
See application file for complete search history.

(56) References Cited

U.S. PATENT DOCUMENTS

| | | | | |
|---|---|---|---|---|
| 6,532,490 B1* | 3/2003 | Lewis | .................. | H04L 69/329 709/213 |
| 8,060,697 B1* | 11/2011 | Kneisley | ........... | G06F 17/30902 707/672 |
| 8,180,720 B1* | 5/2012 | Kovacs | ............... | H04L 67/2842 706/47 |
| 8,437,773 B2* | 5/2013 | Sridhara | ................ | H04H 60/49 370/338 |
| 2002/0107934 A1* | 8/2002 | Lowery et al. | ............... | 709/213 |
| 2002/0143855 A1* | 10/2002 | Traversat et al. | ............. | 709/202 |
| 2002/0156893 A1* | 10/2002 | Pouyoul et al. | ............. | 709/225 |
| 2004/0088347 A1* | 5/2004 | Yeager et al. | ................ | 709/202 |
| 2004/0111441 A1* | 6/2004 | Saito et al. | ................... | 707/200 |

(Continued)

FOREIGN PATENT DOCUMENTS

CN 1928839 A 3/2007

OTHER PUBLICATIONS

Forestiero, Agostino et al., Self-chord: a bio-inspired P2P framework for self-organizing distributed systems, IEEE/ACM Transactions on Networking, Oct. 2010, pp. 1651-1664, vol. 18, No. 5, IEEE.

(Continued)

*Primary Examiner* — Gregory Todd
(74) *Attorney, Agent, or Firm* — Amin, Turocy & Watson, LLP

(57) ABSTRACT

Examples are disclosed for peer-to-peer data migration between nodes coupled via one or more peer-to-peer communication links.

42 Claims, 9 Drawing Sheets

Directory File 500

| 510 | 520 | 530 | 540 | 550 | 560 | 570 |
|---|---|---|---|---|---|---|
| Node ID | Node Location | Data Source Address | Data Size | Time to Download | Data/Time Downloaded | Time-to-Live |

(56) References Cited

U.S. PATENT DOCUMENTS

| | | | |
|---|---|---|---|
| 2006/0159109 A1* | 7/2006 | Lamkin et al. | 370/401 |
| 2007/0233517 A1* | 10/2007 | Dayal | 705/2 |
| 2008/0027982 A1* | 1/2008 | Subramanian | G06F 17/30902 |
| 2009/0106355 A1* | 4/2009 | Harrow et al. | 709/203 |
| 2009/0210495 A1* | 8/2009 | Wolfson et al. | 709/205 |
| 2009/0265772 A1* | 10/2009 | Hitchcock | G06F 21/335 726/7 |
| 2010/0306339 A1* | 12/2010 | Ling et al. | 709/213 |
| 2012/0124384 A1* | 5/2012 | Livni | H04L 9/3247 713/178 |
| 2013/0073669 A1* | 3/2013 | Roberts et al. | 709/214 |

OTHER PUBLICATIONS

Raftopoulou, Paraskevi et al., iCluster: a self-organizing overlay network for P2P information retrieval, Lecture Notes in Computer Science, 2008, pp. 65-76, vol. 4956, Springer-Verlag, Berlin.

Gnutella2, What is Gnutella2?, last modified on Oct. 27, 2005, accessed online on May 16, 2012 via http://g2.trillinux.org/index.php?title=Gnutella2.

Gnutella2, Node types and responsibilities, last modified on Mar. 27, 2005, accessed online on May 16, 2012 via http://g2.trillinux.org/index.php?title=Node_Types_and_Responsibilities.

Freedman, Michael J., et al., Sloppy hashing and self-organizing clusters, accessed online on May 16, 2012 via http://reference.kfupm.edu.sa/content/s/l/sloppy_hashing_and_self_organizing_clust_81759.pdf.

IEEE Std 802.11a-1999, Part II: Wireless LAN Medium Access Control (MAC) and Physical Layer (PHY) specifications, 1999, IEEE.

Sailhan, Francoise, et al., Energy-aware web caching for mobile terminals, Proceedings of the 22nd International Conference on Distributed Computing Systems Workshop (ICDCSW'02), 2002, pp. 820-825, IEEE Computer Society.

Wolfson, Ouri, et al., Resource discovery using spatio-temporal information in mobile ad-hoc networks, Lecture Notes in Computer Science, 2005, vol. 3833, pp. 129-142, Springer-Verlag, Berlin.

Wolfson, Ouri, MOBI-DIK: An approach to querying data in a mobile ad hoc network, Proceedings of the Workshop on Research Directions in Situational-aware Self-managed Proactive Computing in Wireless Adhoc Networks, Mar. 2009, St. Louis, MO, accessed online on May 16, 2012 via http://www.cs.uic.edu/~boxu/mp2p/rdwan-wshop-stlouis.pdf.

United States Patent and Trademark Office, International Search Report and Written Opinion of the International Searching Authority for PCT/US11/52402, mailed on Feb. 7, 2012.

Tyson, Gareth, et al., Corelli: A peer-to-peer dynamic replication service for supporting latency-dependent content in community networks, Multimedia Computing and Networking (MMCN), Jan. 19-20, 2009, San Jose, CA, USA.

* cited by examiner

Directory File 500

| 510 | 520 | 530 | 540 | 550 | 560 | 570 |
|---|---|---|---|---|---|---|
| Node ID | Node Location | Data Source Address | Data Size | Time to Download | Data/Time Downloaded | Time-to-Live |

FIG. 5

Calling Card 600

| 610 | 620 | 630 |
|---|---|---|
| Node ID | Node Location | Data Source Address |

FIG. 6

900 A computer program product.

902 A signal bearing medium.

904 instructions for a peer-to-peer data migration, which, when executed by logic, cause the logic to:

receive data at a first node coupled to a second node via a first peer-to-peer communication link, the data received from a data source located remote to both the first node and the second node;

store the data in a public cache associated with the first node, the public cache maintained in a portion of memory configured to be accessible to the second node via the first peer-to-peer communication link;

assign set a time-to-live timer for the data based, at least in part, on a life span value associated with the data, wherein the data is to be deleted from the public cache associated with the first node in response to the expiration of the time-to-live timer;

determine a location of the second node relative to a location of the first node; or adjust the time-to-live timer based, at least in part, on the location of the second node.

| 906 a computer-readable medium. | 908 a recordable medium. | 910 a communications medium. |

FIG. 9

PEER-TO-PEER DATA MIGRATION

CROSS-REFERENCE TO RELATED APPLICATION

This Application is the U.S. National Stage filing under 35 U.S.C. §371 of International Application No. PCT/US11/52402 filed on Sep. 20, 2011.

BACKGROUND

Unless otherwise indicated herein, the approaches described in this section are not prior art to the claims in this application and are not admitted to be prior art by inclusion in this section.

A communication network may include one or more nodes. These nodes may include, but are not limited to, various types of devices that may be configured to couple to the communication network via wired and/or wireless network communication links. Also, the nodes may be interconnected to other nodes in the communication network via wired and/or wireless peer-to-peer communication links. In some examples, the nodes may be further interconnected to nodes that are part of other communication networks via additional peer-to-peer communication links. As a result, nodes may be connected to both their respective communication network and to a broader peer-to-peer network.

SUMMARY

In various embodiments, the present disclosure describes example methods for peer-to-peer data migration. The example methods may include receiving data at a first node communicatively coupled to a second node via a first peer-to-peer communication link. The data may have been received via a network communication link from a data source located remote to both the first node and the second node. The data may then be stored in a public cache associated with the first node. The public cache may be maintained in a portion of memory configured to be accessible to the second node via the first peer-to-peer communication link In some examples, a time-to-live timer for the data may be set based, at least in part, on a life span value associated with the data. The data may then be deleted from the public cache associated with the first node in response to expiration of the time-to-live timer. Also, the methods may include receiving a copy request from the second node to copy the data from the public cache associated with the first node. A determination may then be made of a location of the second node relative to a location of the first node and the time-to-live timer may be adjusted based, at least in part, on the location of the second node.

In various embodiments, the present disclosure also describes other example methods for peer-to-peer data migration. The other example methods may include maintaining a first public cache associated with a first node. The first public cache may be accessible by other nodes via one or more peer-to-peer communication links. In some examples, a directory file may be stored in the first public cache. The directory file may be configured to include information associated with data stored in a second public cache associated with a second node. The directory file may also include a location of the second node. A time-to-live timer for the directory file may be set based, at least in part, on a life span value associated with the directory file. The directory file may then be deleted from the first public cache in response to the expiration of the time-to-live timer. Also, the additional methods may include receiving a directory request from a third node for the information associated with the data included in the directory file. A determination may then be made of a location of the third node relative to a location of the first node and the time-to-live timer may be adjusted based, at least in part, on the location of the second node and the location of the third node.

In various embodiments, the present disclosure also describes example devices for peer-to-peer data migration. The example devices may include a file manager having logic. The logic may be configured to receive data at a first node coupled to a second node via a first peer-to-peer communication link. The data may be received from a data source located remote to both the first node and the second node. The logic may also be configured to store the data in a public cache associated with the first node. The public cache may be maintained in a portion of memory configured to be accessible to the second node via the first peer-to-peer communication link. The logic may also be configured to set a time-to-live timer for the data based, at least in part, on a life span value associated with the data. In some examples, the data may later be deleted from the public cache associated with the first node in response to the expiration of the time-to-live timer. The logic may also be configured to receive a copy request from the second node to copy the data from the public cache associated with the first node and determine a location of the second node relative to a location of the first node. The logic may be further configured to adjust the time-to-live timer based, at least in part, on the location of the second node.

In various embodiments the present disclosure also describes example systems that may include a memory associated with a first node. The memory may be configured to include a first public cache accessible to other nodes coupled to the first node via one or more peer-to-peer communication links. The example systems may also include a directory manager having logic. The logic may be configured to store a directory file in the first public cache, the directory file to include information associated with data stored in a second public cache associated with a second node, the directory file to also include a location of the second node. The logic may also be configured to set a time-to-live timer for the directory file based, at least in part, on a life span value associated with the directory file, wherein the directory file is to be deleted from the first public cache in response to the expiration of the time-to-live timer. The logic may also be configured to receive a directory request from a third node. The directory request may include a request for the information associated with the data stored in the second public cache included in the directory file. In some examples, the logic may be further configured to determine a location of the third node relative to a location of the first node and adjust the time-to-live timer based, at least in part, on both the location of the second node and the location of the third node.

In various embodiments, the present disclosure also describes example computer program products. In some examples, the computer program products may include a signal bearing medium having instructions for peer-to-peer data migration. The instructions, which, when executed by logic may cause the logic to receive data at a first node coupled to a second node via a first peer-to-peer communication link. The data may be received from a data source located remote to both the first node and the second node. The instructions may also cause the logic to store the data in a public cache associated with the first node. The public cache may be maintained in a portion of memory configured to be accessible to the second node via the first peer-to-peer communication link. The instructions may also cause the logic to set a time-to-live timer for the data based, at least in part, on a life span value associated with the data. In some examples, the data may later be deleted from the public cache associated with the first node in response to the expiration of the time-to-live timer. The instructions may also cause the logic to receive a copy request from the second node to copy the data from the public cache associated with the first node and determine a location of the second node relative to a location of the first node. The instructions may further cause the logic to adjust the time-to-live timer based, at least in part, on the location of the second node.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 5 illustrates an example directory file;

FIG. 6 illustrates an example calling card for a node maintaining a directory file;

FIG. 9 illustrates a block diagram of an example computer program product.

DETAILED DESCRIPTION

Figure 1:
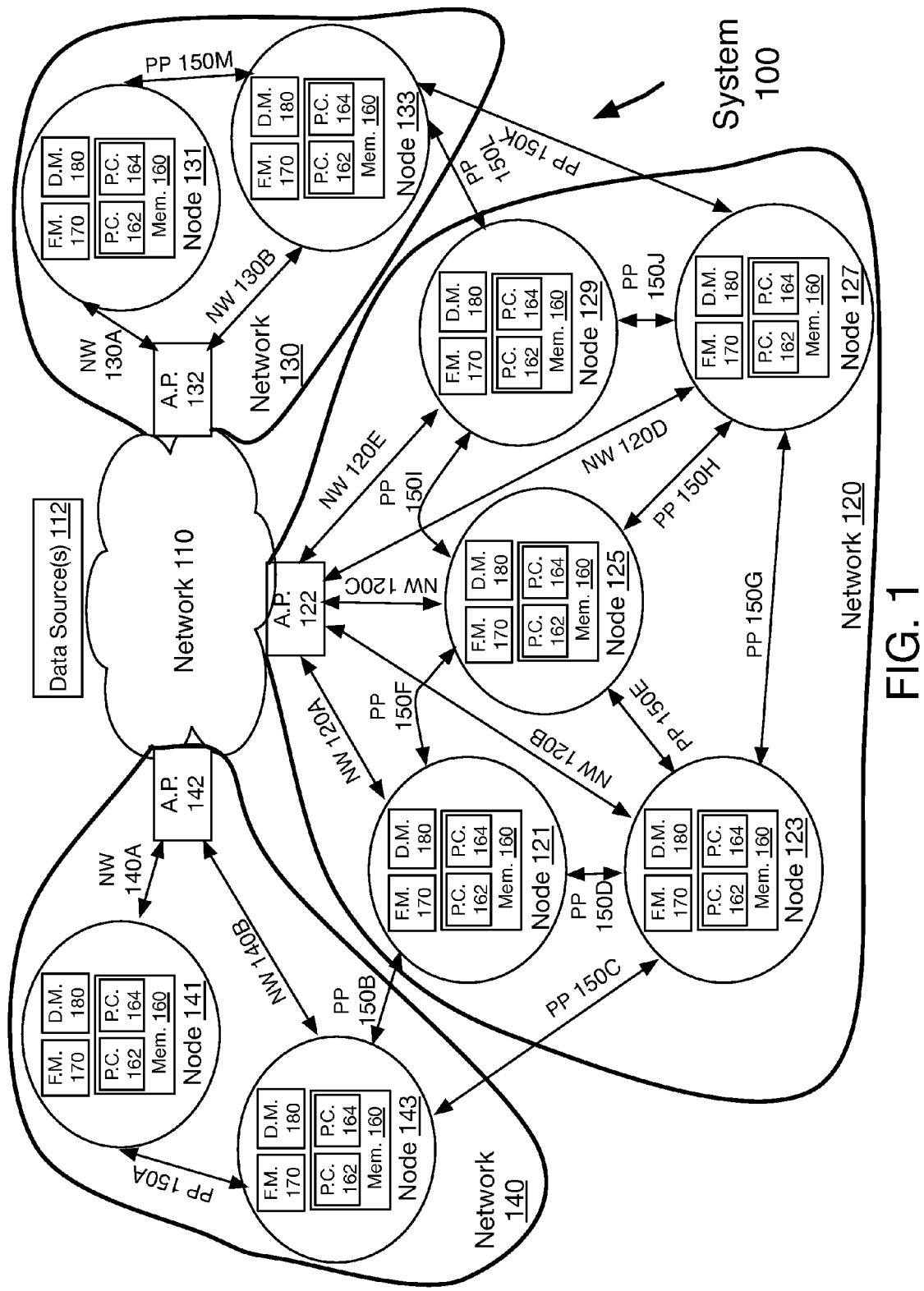
FIG. 1 illustrates an example system with nodes interconnected via one or more peer-to-peer communication links and separately coupled to one or more remote data sources via a network communication link.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to peer-to-peer data migration between nodes coupled via one or more peer-to-peer communication links.

As contemplated in the present disclosure, nodes may be connected to both their respective communication network and to a broader peer-to-peer network made up of other nodes. In some examples, each node in its respective communication network may obtain data from a data source that may be located remotely relative to each node. For example, a node's communication network may enable the node to couple to the data source via the Internet. The data source may be a remotely located server that provides video and/or audio data to the node. Several other nodes may also seek the same video and/or audio data from the remotely located server. The server and/or the network communication links coupling the nodes to the server may have limited capacity to handle multiple requests for the same video and/or audio data. The limited capacity may be problematic to at least some nodes receiving the video and/or audio data in a timely and error free manner.

In some examples, methods are implemented for peer-to-peer data migration. The methods may include receiving data at a first node communicatively coupled to a second node via a first peer-to-peer communication link. The data (e.g., video/audio files) may have been received via a network communication link from a data source located remote to both the first node and the second node. The data may then be stored in a public cache associated with the first node. The public cache may be maintained in a portion of memory configured to be accessible to the second node via the first peer-to-peer communication link In some examples, a time-to-live timer for the data may be set based, at least in part, on a life span value associated with the data. The data may then be deleted from the public cache associated with the first node in response to expiration of the time-to-live timer. Also, the methods may include receiving a copy request from the second node to copy the data from the public cache associated with the first node. A determination may then be made of a location of the second node relative to a location of the first node and the time-to-live timer may be adjusted based, at least in part, on the location of the second node.

In some other examples, additional methods are implemented for peer-to-peer data migration. The additional methods may include maintaining a first public cache associated with a first node. The first public cache may be accessible by other nodes via one or more peer-to-peer communication links. In some examples, a directory file may be stored in the first public cache. The directory file may be configured to include information associated with data stored in a second public cache associated with a second node. The directory file may also include a location of the second node. A time-to-live timer for the directory file may be set based, at least in part, on a life span value associated with the directory file. The directory file may then be deleted from the first public cache in response to the expiration of the time-to-live timer. Also, the additional methods may include receiving a directory request from a third node for the information associated with the data included in the directory file. A determination may then be made of a location of the third node relative to a location of the first node and the time-to-live timer may be adjusted based, at least in part, on the location of the second node and the location of the third node.

FIG. 1 illustrates an example system 100 with nodes interconnected via one or more peer-to-peer communication links and separately coupled to one or more remote data sources via a network communication link in accordance with at least some embodiments of the present disclosure. As shown in FIG. 1, peer-to-peer system 100 includes access points 122, 132 and 142 via which nodes of networks 120, 130 and 140, respectively, may couple to a network 110. Also, network 110 may couple to data source(s) 112 and nodes of networks 120, 130 and 140 may access data and/or content maintained at or with data source(s) 112. In some examples, nodes in a respective network may separately couple to network 110 through an access point via a network communication link. For example, as shown in FIG. 1, nodes 121, 123, 125, 127 and 129 of network 120 may couple through access point 122 via network communications links 120A-120E. Nodes may also communicatively couple to other nodes to form a kind of peer-to-peer network that may be separate from and in addition to networks 110, 120, 130 and 140. For example, as shown in FIG. 1, the nodes of system 100 may be interconnected via peer-to-peer communication links 150A-150M.

In some examples, as shown in FIG. 1, each node may include a memory 160, a file manager (FM) 170 and a directory manager (DM) 180. Memory 160 is further shown in FIG. 1 to include a public cache 162 and a private cache 164. Pubic cache 162 may be configured or arranged to maintain data and/or content and may be accessible to other nodes via one or more peer-to-peer communication links. Private cache 164 may be configured or arranged to maintain data and/or content that may be only accessible to logic or features resident on or co-located with a given node (e.g., an operating system). Memory 160 may include, but is not limited to various types of memory such as volatile memory, non-volatile memory, flash memory, programmable variables or states, random access memory (RAM), read-only memory (ROM), or other static or dynamic storage media.

According to some examples, node 121 may receive or obtain data from data source(s) 112 via network communication link 120A. For these examples, as shown in FIG. 1, data source(s) 112 may be coupled to network 110 which couples to node 121's network 120 through access point 122. Since network 110 is part of a separate network to node 121's network 120, data source(s) 112 may be considered as remotely located to node 121. The data received from the data source may then be stored in the node 121's public cache 162. The data, for example, may include a video file, an audio file, a multimedia file or a data file, although this disclosure is not limited to these example types of files.

According to some examples, downloading of the data from data source(s) 112 may place a burden on or utilize a large amount of network resources. In order to lessen this burden, the data may be at least temporarily stored in node 121's public cache 162 and then made accessible to other nodes to copy. The other nodes may use peer-to-peer communication links that may be less network resource intensive and/or may enable the other nodes to more quickly obtain or copy the data compared to going to data source(s) 112 to obtain the data.

In some examples, file manager 170 at node 121 may include logic and/or features configured to assign and/or set a time-to-live timer for the data received from the remotely located data source. The time-to-live timer may be assigned and/or set based on a life span value associated with the data. The life span value, for example, may include a time period (e.g., in seconds, minutes, hours, etc.) for which data may remain stored in node 121's public cache 162. Upon expiration of the time-to-live timer (e.g., end of the time period) the data may be deleted from node 121's public cache. Maintaining the data for the assigned or set time period may ensure that node 121's public cache 162 has additional or freed up storage capacity at a predetermined time in the future.

According to some examples, node 125 may desire to copy the data at least temporarily stored in node 121's public cache 162. For these examples, node 125 may send a copy request (e.g., via peer-to-peer communication link 150F) to node 121. Node 121 may receive the copy request and file manager 170 may include logic and/or features configured to determine a location (either logical or physical) of node 125 relative to the location of node 121. For example, the copy request may include location information to indicate node 125's location (e.g., global positioning system (GPS) information). File manager 170 may then adjust or reset the time-to-live timer previously assigned to the data stored in node 121's public cache based on the determined location of node 125.

In some examples, the time-to-live timer may also be adjusted to a shorter time period or to longer time period based not only on the location of node 125 but on location(s) associated with other nodes that may also place copy requests to node 121. The location of node 125 as well as the location of the other nodes relative to node 121 may indicate to file manager 170 at node 121 that other nodes may be at a more or less centralized distribution point for sharing the data. For example, node 125 is more centralized to nodes 123, 127 and 129 than node 121 is to these nodes. As a result of being more centralized, more nodes may request the data that node 125 has copied and stored in its public cache 162 compared to the data currently stored in node 121's public cache 162.

In some examples, a director manager 180 at node 121 may include logic and/or features configured to store a directory file in node 121's public cache 162. As described in more detail below, the directory file may include information associated with data stored in other public caches for other nodes. For example, information associated with data that may be stored in node 123's public cache 162 and/or information associated with data that may be stored in node 143's public cache 162. The information associated with data stored in the aforementioned public caches may include an indication of a location of the respective nodes and may include other indications such as the types and sizes of data files maintained in the public caches of each of the respective nodes.

According to some examples, similar to what was described above for assigning and/or setting a time-to-live timer for data received from a remote data source, director manager 180 may also include logic and/or features configured to assign and/or set a time-to-live timer for the directory file stored in node 123's public cache 162. The time-to-live timer may be assigned and/or set based on a life span value associated with the directory file. The life span value, for example, may include a time period (e.g., in seconds, minutes, hours, etc.) for which the directory file may remain stored in node 123's public cache 162. Upon expiration of the time-to-live timer (e.g., end of the time period) the data may be deleted from node 121's public cache 162.

In some examples, other nodes may have knowledge of node 123's having the directory file stored in its public cache 162. These other nodes (e.g., node 125) may place a directory request to obtain information associated with data stored in node 121's public cache 162. Node 123 may receive the directory request and directory manager 180 may include logic and/or features configured to determine a location (either logical or physical) of node 125 relative to the location of node 123. For example, the directory request may include location information to indicate node 125's location (e.g., GPS information). Directory manager 180 may then adjust or reset the time-to-live timer previously assigned to the directory file stored in node 123's public cache 162 based on the determined location of node 125.

In some examples, the time-to-live timer may be adjusted to a shorter time period or to longer time period based not only on the location of node 125 but on location(s) associated with other nodes that may also place directory requests to node 123. The location of node 125 as well as the location of the other nodes relative to node 123 may indicate to directory manager 180 at node 123 that other nodes may be at a more or less centralized distribution point for sharing information included in its stored directory file. For example, node 121 may be more centralized to nodes 143, 121 and 125 than node 123 is to these nodes. As a result of being more centralized, more nodes may request a directory file stored in node 121's public cache 162 than the currently stored directory file in node 123's public cache 162.

According to some examples, networks 120, 130 and 140 may be part of wired and/or wireless local access networks or wide area networks that may enable nodes to couple to network 110. For these examples, network 110 may be the Internet and although not shown in FIG. 1, data source(s) 112 may be part of other networks coupled to network 110 and thus may be considered as remotely located to the nodes of system 100 included in networks 120, 130 and 140. The network communication links depicted in system 100 may operate in accordance with one or more wired and/or wireless standards. These wired and/or wireless standards may be described in one or one or more industry standards such as those associated with IEEE, 802.1, IEEE 802.11, IEEE 802.16, GSM, GPRS, EDGE, W-CDMA, HSPA, CDMA-2000, EV-DO, LTE or TD-LTE. Although this disclosure is not limited to only the above-mentioned wired and/or wireless standards.

In some examples, the peer-to-peer communication links shown in FIG. 1 may also operate in accordance with one or more wired and/or wireless standards as mentioned above. However, the nodes of system 100 may be able to share resources (e.g., public caches) through the peer-to-peer communication links without the need for centralized coordination. These peer-to-peer communication links may be established via wired and/or wireless local access networks or wide area networks that may operate in accordance with the industry standards mentioned above. The peer-to-peer communication links may also be established via direct node to node links using wireless technologies such as Bluetooth™.

Figure 2:
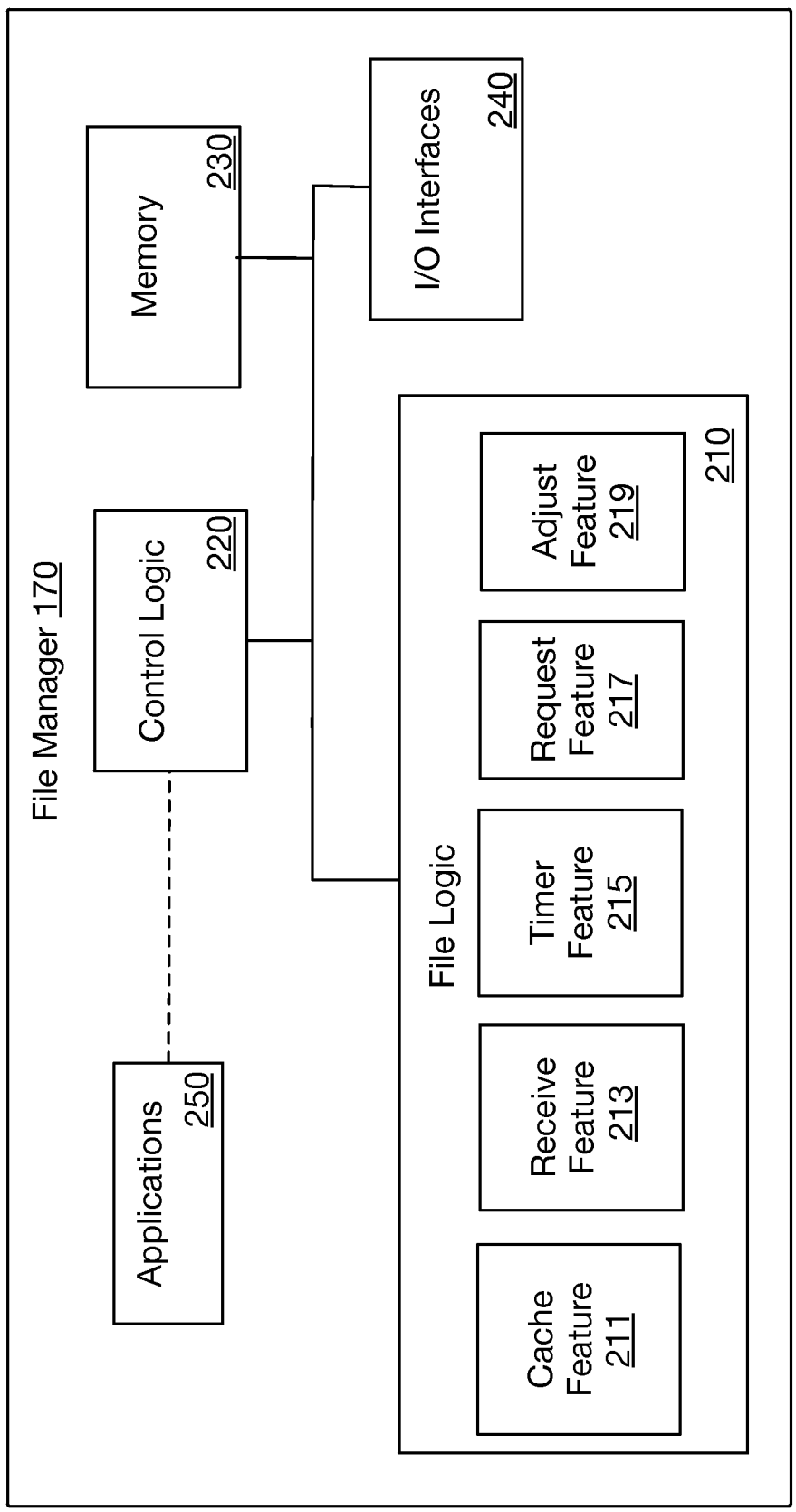
FIG. 2 illustrates a block diagram of an example architecture for a file manager.

FIG. 2 illustrates a block diagram of an example architecture for a file manager in accordance with at least some embodiments of the present disclosure. As described above for system 100 in FIG. 1, each node may include a file manager, such as file manager 170. In some examples, file manager 170 includes features and/or logic configured or arranged to receive data via a network communication link and facilitate peer-to-peer data migration between nodes coupled via one or more peer-to-peer communication links.

The example file manager 170 of FIG. 2 includes file logic 210, control logic 220, a memory 230, input/output (I/O) interfaces 240 and optionally one or more applications 250.

As illustrated in FIG. 2, file logic 210 is coupled to control logic 220, memory 230 and I/O interfaces 240. Also illustrated in FIG. 2, the optional applications 250 are arranged in cooperation with control logic 220. File logic 210 may further include one or more of a cache feature 211, a receive feature 213, a timer feature 215, a request feature 217, or an adjust feature 219, or any reasonable combination thereof.

In some examples, the elements portrayed in FIG. 2's block diagram are configured to support or enable file manager 170 as described in this disclosure. A given file manager 170 may include some, all or more elements than those depicted in FIG. 2. For example, file logic 210 and control logic 220 may separately or collectively represent a wide variety of logic device(s) to implement the features of file manager 170. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, file logic 210 includes one or more of a cache feature 211, a receive feature 213, a timer feature 215, a request feature 217, or an adjust feature 219. File logic 210 may be configured to use one or more of these features to perform operations. As described in more detail below, example operations may include facilitating peer-to-peer data migration between nodes.

In some examples, control logic 220 may be configured to control the overall operation of file manager 170. As mentioned above, control logic 220 may represent any of a wide variety of logic device(s) configured to operate in conjunction with executable content or instructions to implement the control of file manager 170. In some alternate examples, the features and functionality of control logic 220 may be implemented within file logic 210.

According to some examples, memory 230 is arranged to store executable content or instructions. The executable content or instructions may be used by control logic 220 and/or file logic 210 to implement or activate features or elements of file manager 170. As described more below, memory 230 may also be arranged to temporarily maintain information associated with assigning and/or setting a time-to-live timer for data received from a remote data source. Memory 230 may also at least temporarily maintain information associated with adjusting the time-to-live time for the data based on other node location information obtained from, for example, copy requests for the data received from the other nodes.

Memory 230 may include a wide variety of memory media including, but not limited to, one or more of volatile memory, non-volatile memory, flash memory, programmable variables or states, RAM, ROM, or other static or dynamic storage media.

In some examples, I/O interfaces 240 may provide an interface via an internal communication medium or link between a file manager 170 and elements resident on or located with a node that includes the file manager 170. I/O interfaces 240 may include interfaces that operate according to various communication protocols to communicate over the internal communication link (e.g., Inter-Integrated Circuit (I²C), System Management Bus (SMBus) or Serial Peripheral Interface Bus (SPI), etc.). I/O interfaces 240 may also provide an interface between file manager 170 and elements located remote to a node. For example, as mentioned above for FIG. 1, nodes having a file manager 170 may couple to a network access point via network communication links or may couple to other nodes via one or more peer-to-peer communication links. The I/O interfaces 240, for example, include an interface configured to operate according to various wired or wireless communication protocols to allow file manager 170 to communicate over these communication links (e.g., IEEE, 802.1, IEEE 802.11, IEEE 802.16, GSM, GPRS, EDGE, W-CDMA, HSPA, CDMA-2000, EV-DO, LTE, TD-LTE, Bluetooth, etc.).

In some examples, file manager 170 includes one or more applications 250 to provide instructions to control logic 220 and/or file logic 210. These instructions, for example, may include instructions for file manager 170 to implement or use one or more of a cache feature 211, a receive feature 213, a timer feature 215, a request feature 217, or an adjust feature 219.

Figure 3:
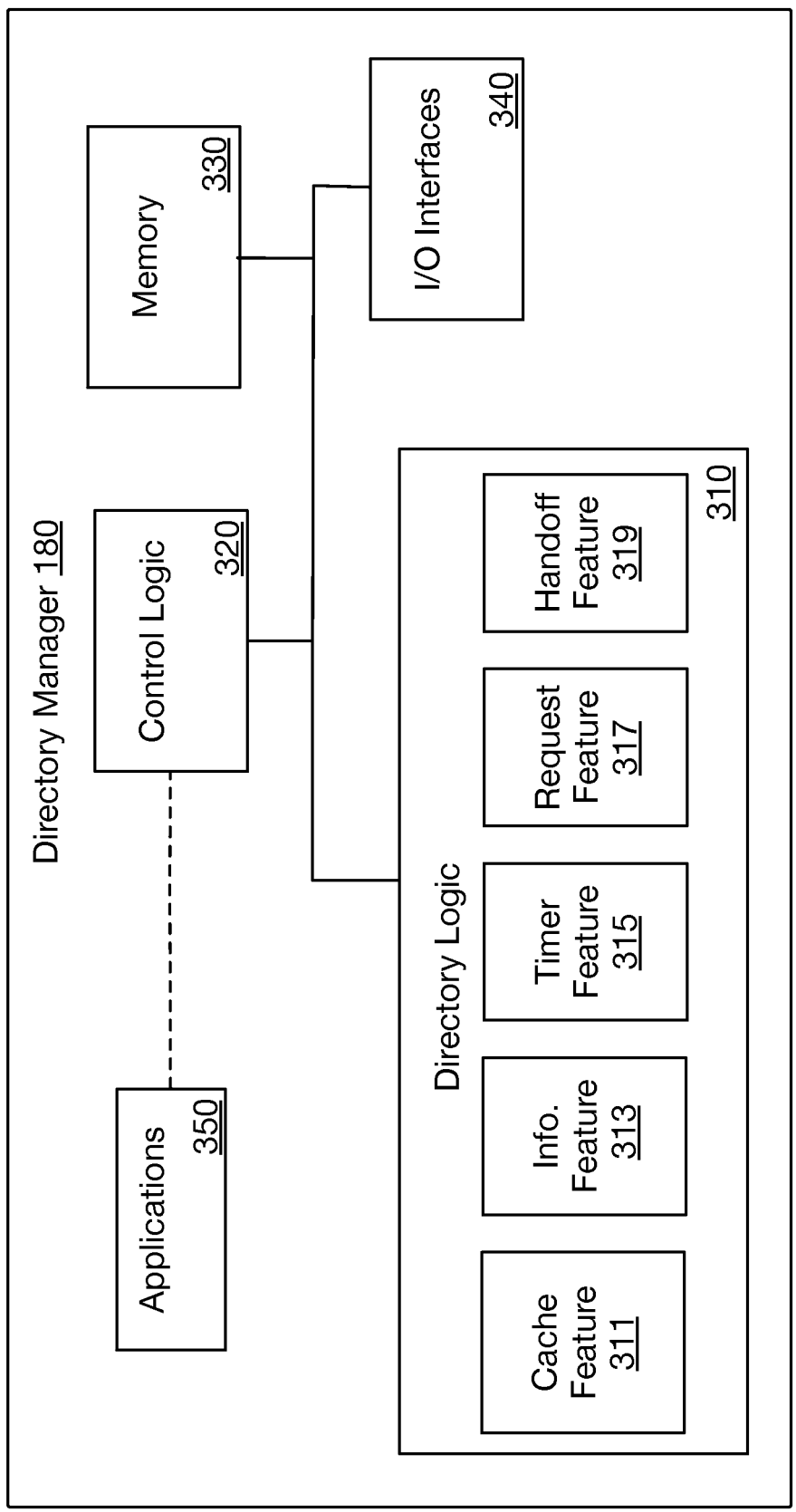
FIG. 3 illustrates a block diagram of an example architecture for a director manager.

FIG. 3 illustrates a block diagram of an example architecture for a directory manager in accordance with at least some embodiments of the present disclosure. As described above for system 100 in FIG. 1, each node may include a directory manager, such as directory manager 180. In some examples, directory manager 180 includes features and/or logic configured or arranged to maintain a directory file in a node's public cache to facilitate peer-to-peer data migration between nodes coupled via one or more peer-to-peer communication links.

The example directory manager 180 of FIG. 3 includes directory logic 310, control logic 320, a memory 330, input/output (I/O) interfaces 340 and optionally one or more applications 350. As illustrated in FIG. 3, directory logic 310 is coupled to control logic 320, memory 330 and I/O interfaces 340. Also illustrated in FIG. 3, the optional applications 350 are arranged in cooperation with control logic 320. Directory logic 310 may further include one or more of a cache feature 311, an information feature 313, a timer feature 315, a request feature 317, or an adjust feature 319, or any reasonable combination thereof.

In some examples, the elements portrayed in FIG. 3's block diagram are configured to support or enable directory manager 122 as described in this disclosure. A given directory manager 180 may include some, all or more elements than those depicted in FIG. 3. For example, directory logic 310 and control logic 320 may separately or collectively represent a wide variety of logic device(s) to implement the features of directory manager 180. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 3, directory logic 310 includes one or more of a cache feature 311, an information feature 313, a timer feature 315, a request feature 317, or an adjust feature 319. Directory logic 310 may be configured to use one or more of these features to perform operations. As described in more detail below, example operations may include storing a directory file at a node's public cache that has information associated with data stored in the public cache of other nodes and accessible via one or more peer-to-peer communication links.

In some examples, control logic 320 may be configured to control the overall operation of directory manager 180. Similar to control logic 220 mentioned above, control logic 320 may represent any of a wide variety of logic device(s) configured to operate in conjunction with executable content or instructions to implement the control of directory manager 180. In some alternate examples, the features and functionality of control logic 320 may be implemented within directory logic 310.

According to some examples, memory 330 is arranged to store executable content or instructions. The executable content or instructions may be used by control logic 320 and/or directory logic 310 to implement or activate features or elements of directory manager 180. As described more below, memory 330 may also be arranged to temporarily maintain information associated with assigning and/or setting a time-to-live timer for a directory file maintained in a node's public cache. Memory 330 may also at least temporarily maintain information associated with adjusting the time-to-live time for the directory file based on other node location information obtained from, for example, directory requests received from the other nodes.

Memory 330 may include a wide variety of memory media including, but not limited to, one or more of volatile memory, non-volatile memory, flash memory, programmable variables or states, RAM, ROM, or other static or dynamic storage media.

In some examples, similar to I/O interfaces 240 described above, I/O interfaces 340 may provide an interface via an internal communication medium or link between directory manager 180 and elements resident on or located with a node that includes the directory manager 180. Also similar to I/O interface 240, I/O interfaces 340 may also provide an interface between directory manager 180 and elements remote to a node. For example, as mentioned above for FIG. 1, nodes having a directory manager 180 may couple to a network access point via network communication links or may couple to other nodes via one or more peer-to-peer communication links. The I/O interfaces 340, for example, include an interface configured to operate according to various wired or wireless communication protocols to allow directory manager 180 to communicate over these communication links (e.g., IEEE, 802.1, IEEE 802.11, IEEE 802.16, GSM, GPRS, EDGE, W-CDMA, HSPA, CDMA-2000, EV-DO, LTE, TD-LTE, Bluetooth, etc.).

In some examples, directory manager 180 includes one or more applications 350 to provide instructions to control logic 320 and/or directory logic 310. These instructions, for example, may include instructions for directory manager 180 to implement or use one or more of a cache feature 311, an information feature 313, a timer feature 315, a request feature 317, or an adjust feature 319.

Figure 4A:
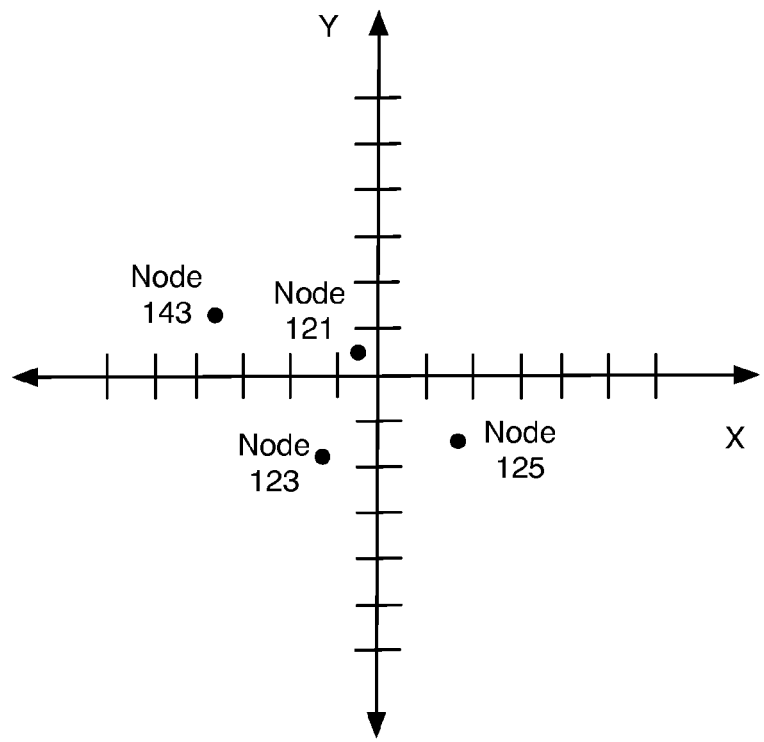
FIGS. 4A-B illustrate graphical depictions of a node's relative position to other nodes.
Figure 4B:
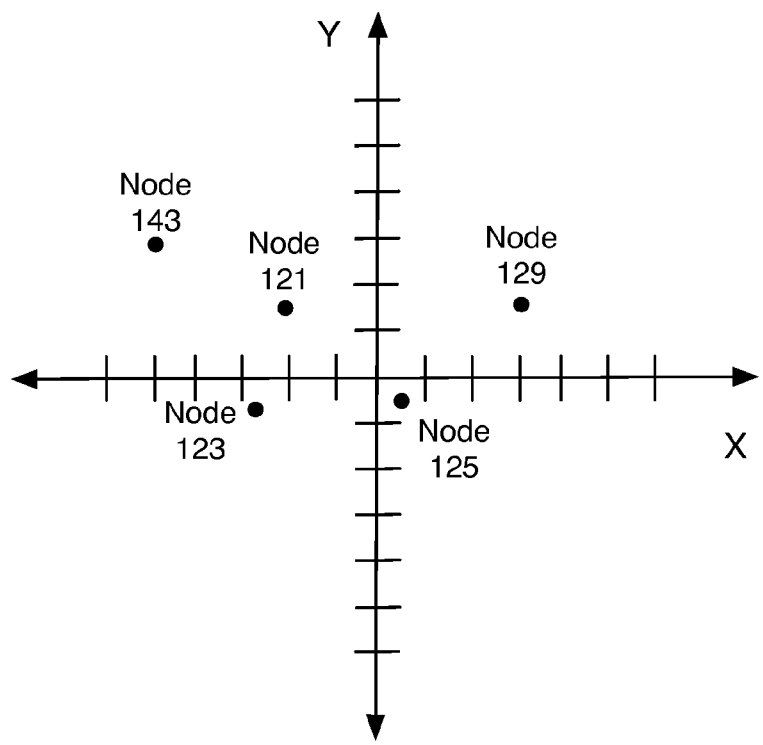

FIGS. 4A-B illustrate graphical depictions of a node's relative position to other nodes in accordance with at least some embodiments of the present disclosure. As shown in FIGS. 4A-B, node 121's relative position to various other nodes of system 100 is depicted utilizing a square grid graph labeled as graph 400. Each distance unit marked on the x-axis or the y-axis of graph 400 may represent a measure of relative distance between node 121 and other nodes of system 100. For example, a distance unit may be a given number of meters or other units of distance. As shown in FIG. 4A, in some examples, node 121's relative location on graph 400 may indicate that node 121 may be aware of the locations of nodes 143, 123 and 125. For this example, node 121 may have become aware of each of these nodes' relative locations based on copy or directory requests received from these nodes or through other means. For example, as individual requests are received at node 121, file manager 170 or directory manager 180 at node 121 may include logic or features configured to first determine the location of the node making the request. The logic or features of file manager 170 or directory manager 180 may also be configured to then determine node 121's relative location to not only the node that sent the request but also to other nodes to which the logic or features may know of their locations. As graph 400 depicts in FIG. 4A, node 121 is in a relatively centralized location (e.g., closest to center of x/y axis) as compared to nodes 143, 123 and 125.

FIG. 4B shows an example where node 121's relative position is no longer in a centralized location relative to other nodes in system 100. In some examples, node 121 may become aware of the location of node 129. As shown in FIG. 4B, node 125 is now in a centralized location relative to the other nodes and node 121's relative position to nodes 143, 123, 125 and 129 has shifted away from a centralized location on graph 400.

According to some examples, file manager 170 or directory manager 180 may include logic and/or features configured to adjust a time-to-live timer set for data or a directory file stored in node 121's public cache based on changes in node 121's relative position to other nodes. For example, if node 121 became aware of another node's location such that node 121 shifted away from a centralized location relative to other nodes in system 100, then the time-to-live timer may be adjusted to expire sooner. For this example, the expedited expiration of the time-to-live timer may be a result of the file manager 170 or the directory manager 180 at node 121 determining that other nodes may be in a more favorable location for data migration in system 100. Alternatively, if node 121 shifted towards a more centralized relative location, then the time-to-live timer may be adjusted to expire later because of node 121's more favorable location for data migration in system 100.

FIG. 5 illustrates an example directory file 500 in accordance with at least some embodiments of the present disclosure. As shown in FIG. 5, directory file 500 includes information associated with data stored in the public caches of various nodes of system 100. In some examples, directory file 500 may be stored in node 121's public cache 162. For these examples, as shown in FIG. 5, the information associated with data stored in each node's respective public cache 162 includes a column 510 for node identifications (IDs), a column 520 for node locations, a column 530 for addresses of data sources, a column 540 for sizes of data (e.g., indicated in bytes), a column 550 for times a respective node took to download the data from a given data source, a column 560 for dates/times of downloads and a column 570 for an estimate of time-to-live values associated with data stored in respective public caches for each node listed in directory file 500.

In some examples, a node's location indicated in column 520 may be a GPS coordinate or other location means (physical or logical) via which nodes of system 100 may be able to determine their relative locations. The data source address indicated in column 530 may be an Internet address that indicates where the data was obtained. The data size in column 540 may indicate how large in memory units (e.g., bytes) the data may be. The time to download in column 550 may indicate how responsive the data source was at the time the data was downloaded by the node. The data/time the data was downloaded indicated in column 550 may be utilized in some examples to estimate the time-to-live value and approximately indicate how long the node may keep the data stored in its public cache before it will be deleted.

According to some examples, a directory manager 180 at node 121 may include logic and/or features configured to store directory file 500 in node 121's public cache 162. Nodes of system 100 may place directory requests to node 121 seeking information on data stored in the public caches of other nodes in system 100. The directory manager 180 at node 121 may assign or set a time-to-live timer for directory file 500 based on a life span value. The directory manager 180 may also adjust the time-to-live timer based on the location of nodes that may place directory requests to node 121. Similar to what was described above for FIG. 1, once the time-to-live timer expires, directory manager 180 may delete directory file 500 from node 121's public cache 162.

In some examples, nodes indicated in directory file 500 may indicate to node 121 that data maintained in their respective public caches has either been deleted or the time-to-live timer has been adjusted. For these examples, node 121's directory manager 180 may include logic and/or features configured to update directory file 500 to reflect either the deletion of the data or a change in the estimated time-to-live value.

According to some examples, the size of directory file 500 may become larger than the available memory in node 121's public cache 162. For these examples, node 121's directory manager 180 may include logic and/or features configured to decline to add additional information to directory file 500 and to indicate to the node providing the information that information associated with data stored in that node's public cache will not be included in directory file 500. Alternatively, directory manager 180 may remove information associated with other data stored in the public cache of another node. For this alternative, directory manager 180 may include logic and/or features to implement one or more schemes (e.g., first-in-first-out, weighted round-robin, etc.) to determine what information to remove from directory file 500 to make room for the new information. The node having information removed from directory file 500 may then be notified of the removal of the information.

FIG. 6 illustrates an example calling card 600 for a node maintaining a directory file in accordance with at least some embodiments of the present disclosure. As shown in FIG. 6, calling card 600 includes abbreviated information from the information included in directory file 500. That abbreviated information is shown in FIG. 6 as Node IDs in column 610, node locations in column 620 and data source addresses in column 630. In some examples, node 121 may provide calling card 600 to a node after the node has provided information to node 121 about data maintained in the node's public cache. For example, if node 127 of system 100 sent or forwarded information regarding data stored in its public cache 162, then node 121's directory manager 180 may include logic and/or features configured to update directory file 500. Calling card 600 may then be sent to node 127 and to other nodes to indicate at least a portion of the information included in directory file 500. Directory manager 180 may also send an updated calling 600 to other nodes in system 100. The updated calling card 600 may indicate that node 121 now maintains information about data stored in node 127's public cache 162.

Figure 7:
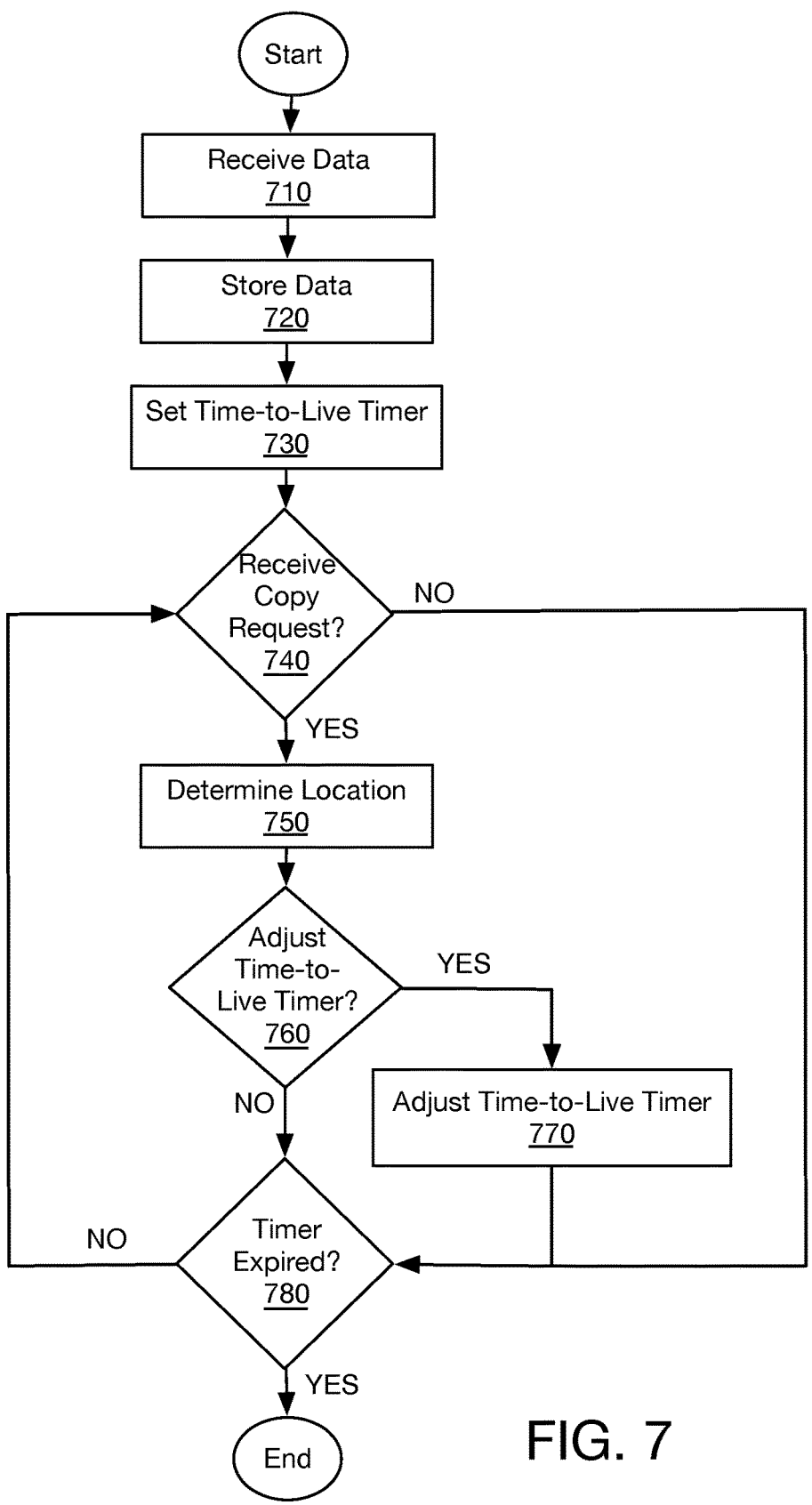
FIG. 7 illustrates a flow chart of example methods for peer-to-peer data migration.

FIG. 7 illustrates a flow chart of example methods for peer-to-peer data migration in accordance with at least some embodiments of the present disclosure. In some examples, system 100 as shown in FIG. 1 is used to illustrate example methods related to the flow chart depicted in FIG. 7. A file manager 170 as shown in FIG. 2 may also be used to illustrate the example methods. But the described methods are not limited to implementations on system 100 as shown in FIG. 1 or to the file manager 170 shown in FIG. 2. The example methods may be implemented on other systems having one or more of the elements depicted in FIG. 1 or FIG. 2.

Beginning at the start and moving to block 710 (Receive Data), file manager 170 of node 121 may include logic and/or features configured to receive data (e.g., via receive feature 213) from data source(s) 112 via network communication link 120A. In some examples, the data may include one or more of a video file, an audio file, a multimedia file or a data file. In some other examples, the data may include a first portion of a video file, an audio file, a multimedia file or a data file. For example, a second portion of the video file, the audio file, the multimedia file or the data file may be stored in a separate public cache associated with another node (e.g., node 123). Separately storing portions of these files may allow for very large files to be received from a data source via one or more network communication links and then stored in more than one node to be distributed to other nodes via peer-to-peer communication links.

Continuing from block 710 to block 720 (Store Data), file manager 170 may include logic and/or features configured to store the received data (e.g., via cache feature 211) in a public cache 162 maintained in a portion of memory 160 of node 121. In some examples, a given node's public cache 162 such as that of node 121's public cache 162 may be configured based on an incentive program that may including receiving a billing credit, a cash subsidy, or an equipment subsidy. For these examples, the incentive program may be offered to a user of node 121 (e.g., a smart phone, tablet, laptop computer, desktop computer, etc) by an operator that maintains network communication links in network 120. The incentive may be offered to the user of node 121 in exchange for providing public access to and allowing a portion of memory 160 to be configured to include public cache 162. Such incentives may be beneficial to the operator of network 120 because the incentives encourage users to utilize peer-to-peer communication links and their own private caches rather than network communication links to obtain data.

Continuing from block 720 to block 730 (Set Time-to-Live Timer), file manager 170 may include logic and/or features configured to set a time-to-live timer based, at least in part, on a life span value associated with the data (e.g., via timer feature 215). In some examples, the life span value associated with the data may be based on several more criteria. For example, a small life span value may be associated with the data due to low or limited available storage capacity in node 121's public cache or due to limited available bandwidth for node 121 to couple to one or more other nodes via peer-to-peer communication links. Also, a small life span value may be the result of a small time window for node 121 to maintain peer-to-peer communication links with other nodes (e.g., node 121 may be moving or trying to conserve power). As a result of at least some of the limitations mentioned above, the time-to-live timer may be set to expire in a relatively short period of time (e.g., in a few minutes).

Continuing from block 730 to decision block 740 (Receive Copy Request?), file manager 170 may include logic and/or features configured to determine whether a copy request has been received (e.g., via request feature 217) from another node in system 100. In some examples, the copy request may be received from node 125 via peer-to-peer communication link 150F and may include an indication of what data node 125 is seeking. If a copy request has been received, request feature 217 may then allow node 125 to access node 121's public cache 162 to copy the data requested and then the process moves to block 750. Otherwise processing moves from decision block 740 to decision block 780.

Continuing from decision block 740 to block 750 (Determine Location), file manager 170 may include logic and/or features configured to determine a location of a node 125 (e.g., via request feature 217). In some examples, the copy request may include an indication of node 125's location. For example, node 125 may have GPS capabilities and may include GPS information in the copy request to indicate node 125's physical position at the time of placing the request. In other examples, the copy request may include a type of network address via which file manager 180 of node 121 may be able to determine a logical and/or physical location of node 125.

Continuing from block 750 to decision block 760 (Adjust Time-to-Live Timer?), file manager 170 may include logic and/or features configured to determine whether the time-to-live timer needs to be adjusted (e.g., via adjust feature 219). In some examples, the determination may be based on whether node 121's relative position to node 125 and other nodes of system 100 has changed. If node 121's relative position has changed, processing may move from decision block 760 to block 770. Otherwise, processing continues from decision block 760 to decision block 780.

Continuing from decision block 760 to block 770 (Adjust Time-to-Live Timer), file manager 170 may include logic and/or features configured to adjust the time-to-live timer associated with the requested data (e.g., via adjust feature 219) based on changes in node 121's relative location. For example, as mentioned above for FIGS. 4A and 4B, node 121's relative position may change from a centralized position to a less centralized position. In a less centralized position, adjust feature 219 may adjust the time-to-live timer to expire sooner. Conversely, in a more centralized position, adjust feature 219 may adjust the time-to-live timer to expire later.

Continuing from block 770 to decision block 780 (Timer Expired?), file manager 170 may include logic and/or features configured to determine whether the time-to-live timer has expired (e.g., via timer feature 215). If the time-to-live timer has expired the data is deleted from node 121's public cache 162 and the process comes to an end. Otherwise, the process moves back to decision block 740.

Figure 8:
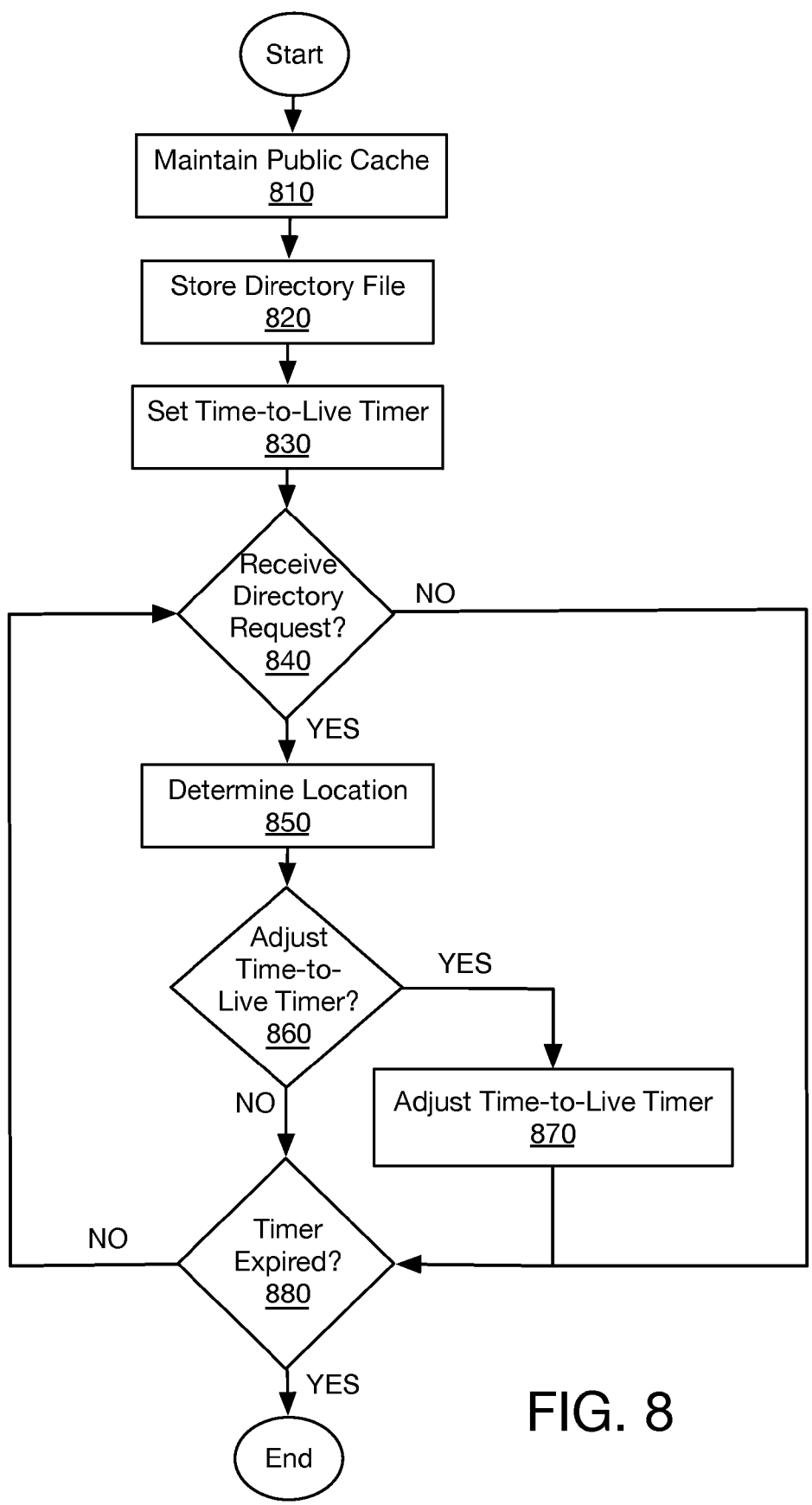
FIG. 8 illustrates a flow chart of other example methods for peer-to-peer data migration.

FIG. 8 illustrates a flow chart of other example methods for peer-to-peer data migration in accordance with at least some embodiments of the present disclosure. In some examples, system 100 as shown in FIG. 1 is used to illustrate example methods related to the flow chart depicted in FIG. 8. A directory manager 180 as shown in FIG. 3 may also be used to illustrate the example methods. But the described methods are not limited to implementations on system 100 as shown in FIG. 1 or to the directory manager 180 shown in FIG. 3. The example methods may be implemented on other systems having one or more of the elements depicted in FIG. 1 or FIG. 3.

Beginning at the start and moving to block 810 (Maintain Public Cache), directory manager 180 of node 123 may include logic and/or features configured to maintain a public cache 162 in a portion of memory 160 (e.g., via cache feature 311). In some examples, as mentioned above, a given node's public cache 162 may be configured based on an incentive program that may include receiving a billing credit, a cash subsidy, or an equipment subsidy. For these examples, incentives may be offered to the user of node 123 in exchange for providing public access to and allowing a portion of memory 160 to be configured to include public cache 162 for use as a place to store one or more directory files. Such incentives may be beneficial to the operator of network 120. For example, the incentives may encourage users to utilize peer-to-peer communication links and find or locate other nodes that may locally store data in a public cache rather than use network communication links and network resources to obtain data from a remote source (e.g., data source(s) 112).

Continuing from block 810 to block 820 (Store Directory File), directory manager 180 may include logic and/or features configured to store a directory file in public cache 162 of node 123 (e.g., via information feature 313). In some examples, the directory file may include information associated with data stored in public cache(s) 162 of one or more other nodes. The data, for example, may have been originally received by the one or more other nodes via a network communication link from a remotely located data source such as data source(s) 112. Also, the same data may have been copied from the node that originally received the data from the remote data source, but now a copy of the data may be maintained in a separate public cache 162 of another node. The directory file may include information identifying both these nodes as having the data or may only indicate the copying node as having the data.

Continuing from block 820 to block 830 (Set Time-to-Live Timer), directory manager 180 may include logic and/or features configured to set a time-to-live timer based, at least in part, on a life span value associated with the data (e.g., via timer feature 315). In some examples, the life span value associated with the directory may be based on several more criteria. For example, a small life span value may be associated with the directory file due to low or limited available bandwidth for node 123 to couple to one or more other nodes via peer-to-peer communication links. Also, a small life span value may be the result of a small time window for node 123 to maintain peer-to-peer communication links with other nodes (e.g., node 123 may be moving or trying to conserve power). As a result of at least some of the limitations mentioned above, the time-to-live timer may be set to expire in a relatively short period of time (e.g., in a few minutes).

Continuing from block 830 to decision block 840 (Receive Directory Request?), directory manager 180 may include logic and/or features configured to determine whether a directory request has been received (e.g., via request feature 317) from another node in system 100. In some examples, the directory request may be received from node 125 via peer-to-peer communication link 150E and may include a search or query for data and its possible location in a given node's public cache 162. If a directory request has been received, request feature 317 may then allow node 125 to access node 121's public cache 162 to obtain directory information maintained in a directory file (e.g., directory file 500) and then the process moves to block 850. Otherwise processing moves from decision block 840 to decision block 880.

Continuing from decision block 840 to block 850 (Determine Location), directory manager 180 may include logic and/or features configured to determine a location of a node 125 (e.g., via request feature 317). In some examples, the directory request may include an indication of node 125's location. For example, node 125 may have GPS capabilities and may include information in the directory request to indicate node 125's physical position at the time of placing the request. In other examples, the directory request may include a type of network address via which directory manager 180 of node 123 may be able to determine a logical and/or physical location of node 125.

Continuing from block 850 to decision block 860 (Adjust Time-to-Live Timer?), directory manager 180 may include logic and/or features configured to determine whether the time-to-live timer needs to be adjusted (e.g., via adjust feature 319). In some examples, the determination may be based on whether node 123's relative position to node 125 and other nodes of system 100 has changed. If node 123's relative position has changed, processing may move from decision block 860 to block 870. Otherwise, processing continues from decision block 860 to decision block 880.

Continuing from decision block 860 to block 870 (Adjust Time-to-Live Timer), directory manager 180 may include logic and/or features configured to adjust the time-to-live timer associated with the directory file (e.g., via adjust feature 319) based on changes in node 123's relative location. For example, similar to what was mentioned above for FIGS. 4A and 4B for node 121, node 123's relative position may change from a centralized position to a less centralized position. In a less centralized position, adjust feature 319 may adjust the time-to-live timer to expire sooner. Conversely, in a more centralized position, adjust feature 219 may adjust the time-to-live timer to expire later.

Continuing from block 870 to decision block 880 (Timer Expired?), directory manager 180 may include logic and/or features configured to determine whether the time-to-live timer has expired (e.g., via timer feature 315). If the time-to-live timer has expired the directory file is deleted from node 123's public cache 162 and the process comes to an end. Otherwise, the process moves back to decision block 840.

FIG. 9 illustrates a block diagram of an example computer program product 900 in accordance with at least some embodiments of the present disclosure. In some examples, as shown in FIG. 9, computer program product 900 includes a signal bearing medium 902 that may also include instructions 904 for peer-to-peer data migration. Instructions 904, which, when executed by logic (e.g., file logic 210), may cause the logic to receive data at a first node coupled to a second node via a first peer-to-peer communication link. The data may be received from a data source located remote to both the first node and the second node. The instructions may also cause the logic to store the data in a public cache associated with the first node. The public cache may be maintained in a portion of memory configured to be accessible to the second node via the first peer-to-peer communication link Instructions 904 may also cause the logic to set a time-to-live timer for the data based, at least in part, on a life span value associated with the data. In some examples, the data may later be deleted from the public cache associated with the first node in response to the expiration of the time-to-live timer. Instructions 904 may also cause the logic to receive a copy request from the second node to copy the data from the public cache associated with the first node and determine a location of the second node relative to a location of the first node. Instructions 904 may further cause the logic to adjust the time-to-live timer based, at least in part, on the location of the second node.

Also depicted in FIG. 9, in some examples, computer program product 900 may include one or more of a computer readable medium 906, a recordable medium 908 and a communications medium 910. The dotted boxes around these elements depict different types of mediums included within, but not limited to, signal bearing medium 902. These types of mediums may distribute instructions 904 to be executed by logic (e.g., file logic 210). Computer readable medium 906 and recordable medium 908 may include, but are not limited to, a flexible disk, a hard disk drive (HDD), a Compact Disc (CD), a Digital Versatile Disk (DVD), a digital tape, a computer memory, etc. Communications medium 910 may include, but is not limited to, a digital and/or an analog communication medium (e.g., a fiber optic cable, a waveguide, a wired communication link, a wireless communication link, etc.).

Figure 10:
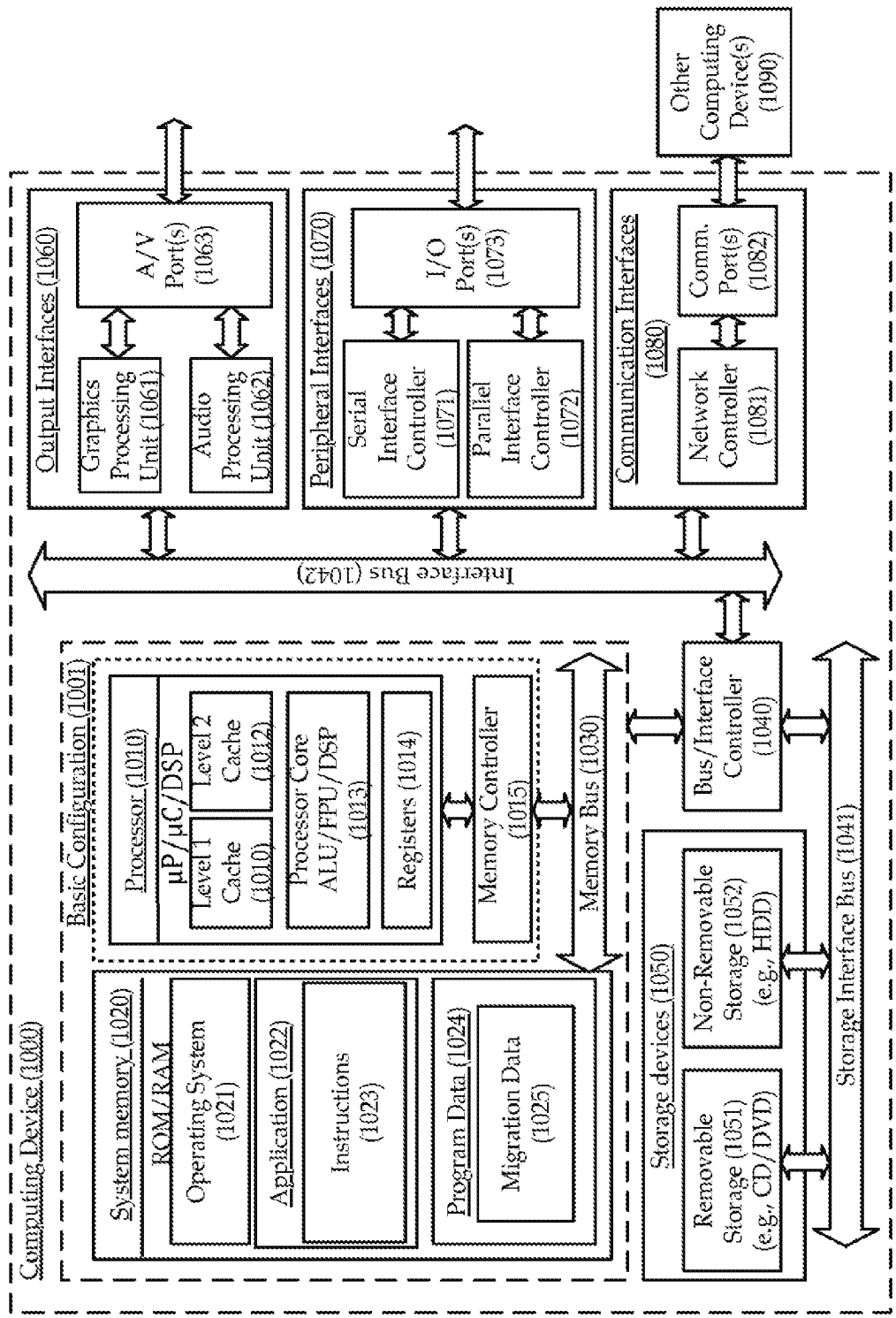
FIG. 10 illustrates an example computing device; all arranged in accordance with at least some embodiment of the present disclosure.

FIG. 10 illustrates an example computing device 1000 in accordance with at least some embodiments of the present disclosure. In some examples, file manager 170 or directory manager 180 depicted in FIG. 1, FIG. 2 or FIG. 3 may be implemented on computing device 1000. In these examples, elements of computing device 1000 may be arranged or configured for peer-to-peer data migration between nodes coupled via one or more peer-to-peer communication links. In a very basic configuration 1001, computing device 1000 typically includes one or more processors 1010 and system memory 1020. A memory bus 1030 can be used for communicating between the processor 1010 and the system memory 1020.

Depending on the desired configuration, processor 1010 can be of any type including but not limited to a microprocessor (µP), a microcontroller (µC), a digital signal processor (DSP), or any combination thereof. Processor 1010 can include one or more levels of caching, such as a level one cache 1011 and a level two cache 1012, a processor core 1013, and registers 1014. The processor core 1013 can include an arithmetic logic unit (ALU), a floating point unit (FPU), a digital signal processing core (DSP Core), or any combination thereof. A memory controller 1015 can also be used with the processor 1010, or in some implementations, the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 1020 typically includes an operating system 1021, one or more applications 1022, and program data 1024. Application 1022 includes instructions 1023 that are arranged to perform the functions as described herein including the actions described with respect to file manager 170 architecture shown in FIG. 2, directory manager 180 architecture shown in FIG. 3 or including the actions described with respect to the flow charts shown in FIGS. 7 and 8. Program Data 1024 includes migration data 1025 that is useful for implementing instructions 1023 (e.g., copying data, determining locations, providing directory information, providing calling cards, setting/adjusting time-to-live timers, etc.). In some examples, application 1022 can be arranged to operate with program data 1024 on an operating system 1021 such that implementations for peer-to-peer data migration between nodes coupled via one or more peer-to-peer communication links may be provided as described herein. This described basic configuration is illustrated in FIG. 10 by those components within dashed line 1001.

Computing device 1000 can have additional features or functionality, and additional interfaces to facilitate communications between the basic configuration 1001 and any required devices and interfaces. For example, a bus/interface controller 1040 can be used to facilitate communications between the basic configuration 1001 and one or more data storage devices 1050 via a storage interface bus 1041. The data storage devices 1050 can be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of computing device 1000.

Computing device 1000 can also include an interface bus 1042 for facilitating communication from various interface devices (e.g., output interfaces, peripheral interfaces, and communication interfaces) to the basic configuration 1001 via the bus/interface controller 1040. Example output interfaces 1060 include a graphics processing unit 1061 and an audio processing unit 1062, which can be configured to communicate to various external devices such as a display or speakers via one or more A/V ports 1063. Example peripheral interfaces 1070 include a serial interface controller 1071 or a parallel interface controller 1072, which can be configured to communicate with external devices such as input devices (e.g., keyboard, mouse, pen, voice input device, touch input device, etc.) or other peripheral devices (e.g., printer, scanner, etc.) via one or more I/O ports 1073. An example communication interface 1080 includes a network controller 1081, which can be arranged to facilitate communications with one or more other computing devices 1090 over a network communication via one or more communication ports 1082. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1000 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 1000 can also be implemented as a personal computer including both laptop computer and non-laptop computer configurations or implemented in a workstation or a server configuration.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, tablets, handsets, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    receiving data by a first node comprising a processor and communicatively coupled to a second node via a first peer-to-peer communication link, wherein the receiving the data comprises receiving the data via a network communication link from a data source located remote to the first node and the second node;
    storing the data in a public cache of the first node, comprising maintaining the public cache in a portion of memory configured to be accessible to the second node via the first peer-to-peer communication link;
    setting a time-to-live timer for the data based, at least in part, on a life span value assigned to the data, comprising estimating the life span value based, at least in part, on an amount of time to download the data from the data source into the public cache;

receiving a copy request from the second node to copy the data from the public cache of the first node;

in response to receiving the copy request, determining a first location of the first node relative to a second location of the second node;

determining whether a change has occurred in the first location of the first node relative to the second location of the second node, and in response to a determination that the change has occurred in the first location of the first node relative to the second location of the second node, adjusting the time-to-live timer, which results in an adjusted time-to-live timer; and deleting the data from the public cache of the first node upon expiration of the adjusted time-to-live timer.

2. The method of claim 1, wherein the life span value assigned to the data is based, at least in part, on a relative response time for the second node to copy the data from the public cache of the first node compared to estimated download times for other nodes to separately receive the data from the data source.

3. The method of claim 1, wherein the life span value assigned to the data is based, at least in part, on at least one of an available storage capacity in the public cache of the first node, an available bandwidth for the first node to communicatively couple to the second node via the first peer-to-peer communication link, or another amount of time the first node remains communicatively coupled to the second node via the first peer-to-peer communication link.

4. The method of claim 1, wherein the data comprises at least one of a video file, an audio file, a multimedia file, or a data file.

5. The method of claim 1, wherein the data includes a first portion of at least one of a video file, an audio file, a multimedia file, or a data file.

6. The method of claim 5, wherein a second portion of the at least one of the video file, the audio file, the multimedia file, or the data file is included in other data stored in a separate public cache of a third node, and wherein the third node is communicatively coupled to the first node via a second peer-to-peer communication link.

7. The method of claim 1, further comprising adjusting the time-to-live timer to expire sooner in response to the change in the first location relative to the second location, which indicates that the first node has shifted away from a centralized location relative to the second node.

8. The method of claim 1, further comprising:

receiving a separate copy request from a third node to copy the data from the public cache;

determining a third location of the third node relative to the first location of the first node; and adjusting the time-to-live timer based, at least in part, on the third location of the third node and the second location of the second node.

9. The method of claim 8, wherein the adjusting the time-to-live timer based, at least in part, on the third location of the third node and the second location of the second node comprises reducing the time-to-live timer in response to determining that the third location of the third node and the second location of the second node indicate that the first node is not in a centralized location relative to the third node and the second node.

10. The method of claim 1, further comprising adjusting the time-to-live timer to expire later in response to the change in the first location relative to the second location, which indicates that the first node has shifted toward a centralized location relative to the second node.

11. The method of claim 1, wherein the determining the second location of the second node relative to the first location of the first node comprises determining the second location of the second node based, at least in part, on information included in the copy request that is used to indicate a physical location of the second node.

12. The method of claim 1, wherein the public cache of the first node comprises a portion of memory to be configured based, at least in part, on an incentive program that includes at least one of a billing credit, a cash subsidy, or an equipment subsidy, and wherein the incentive program is offered to a user device determined to be associated with the first node by a network device in exchange for providing access to and for allowing the portion of memory to be configured to maintain the public cache of the first node.

13. The method of claim 1, wherein the first peer-to-peer communication link includes at least one of a wireless local access network communication link, a wired local access network communication link, a wireless wide area network communication link, a wired wide area network communication link or a Bluetooth communication link, and wherein the network communication link via which each node receives the data from the data source includes the network communication link that communicatively couples the node to the data source via Internet.

14. A method, comprising:

maintaining a first public cache of a first node comprising a processor, the first public cache being accessible by one or more other nodes via one or more peer-to-peer communication links;

storing a directory file in the first public cache, the directory file being configured to include information associated with data stored in a second public cache of a second node, and a second location of the second node;

setting a time-to-live timer for the directory file based, at least in part, on a life span value associated with the directory file, comprising estimating the life span value based, at least in part, on a time interval associated with a download process to download the directory file from a data store into the first public cache, wherein the data store is located remote from the first node and the second node;

receiving a directory request from a third node for the information assigned to the data included in the directory file;

in response to receiving the directory request, determining a first location of the first node relative to a third location of the third node;

determining whether a change has occurred in the first location of the first node relative to the third location of the third node, and in response to a determination that the change has occurred in the first location of the first node relative to the third location of the third node, adjusting the time-to-live timer; and deleting the data from the first public cache of the first node upon expiration of the time-to-live timer.

15. The method of claim 14, wherein the data stored in the second public cache includes data received by the second node via a network communication link from the data store.

16. The method of claim 15, wherein the one or more peer-to-peer communication links include at least one of a wireless local access network communication link, a wired local access network communication link, a wireless wide area network communication link, a wired wide area network communication link, or a Bluetooth communication link, and wherein the network communication link via which the second node received the data from the data store includes the network communication link that communicatively couples the second node to the data store via Internet.

17. The method of claim 15, wherein the information associated with the data stored in the second public cache further includes an indication of a download time for the data received by the second node via the network communication link, the download time to be utilized by the third node to determine whether to copy the data from the second public cache.

18. The method of claim 14, wherein the data stored in the second public cache comprises at least one of a video file, an audio file, a multimedia file, or a data file.

19. The method of claim 14, wherein the data stored in the second public cache includes data copied by the second node from a fourth public cache of a fourth node, wherein the data stored in the fourth public cache includes a portion of the data received by the fourth node via a network communication link from the data store, and wherein the data store is located remote to the first node, the second node, the third node, and the fourth node.

20. The method of claim 14, further comprising adjusting the time-to-live timer to expire sooner in response to the change in the first location of the first node, which indicates that the first node has shifted away from a centralized location relative to the third node.

21. The method of claim 14, further comprising adjusting the time-to-live timer to expire later in response to the change in the first location of the first node, which indicates that the first node has shifted toward a centralized location relative to the third node.

22. The method of claim 14, wherein the determining the first location of the first node relative to the third location of the third node comprises determining the third location of the third node based, at least in part, on information included in the directory request that is utilized to indicate a physical location of the second node.

23. The method of claim 14, further comprising:
receiving a directory copy request from a fourth node to facilitate copying the directory file from the first public cache;
determining a fourth location of the fourth node relative to the first location of the first node;
adjusting the time-to-live timer based, at least in part, on the first, second, third, and fourth locations of the first, second, third, and fourth nodes; and
forwarding an indication of the fourth location of the fourth node to other nodes other than the fourth node in response to deleting the directory file upon expiration of the time-to-live timer.

24. The method of claim 14, further comprising:
receiving information associated with other data stored in a fourth public cache of a fourth node;
determining whether the directory file stored in the first public cache has reached a predetermined memory size; and
adding the information associated with the other data to the directory file stored in the first public cache based, at least in part, on a determination that the predetermined memory size has been reached.

25. The method of claim 14, wherein the information associated with the data stored in the second public cache includes information to indicate when the data will be deleted from the second public cache.

26. The method of claim 14, further comprising:
receiving an indication from the second node that the data stored in the second public cache has been deleted; and
deleting the information assigned to the data stored in the second public cache from the directory file.

27. The method of claim 14, further comprising:
contacting a fourth node, the fourth node having other data stored in a fourth public cache of the fourth node;
receiving other information associated with the other data stored in the fourth public cache;
adding the other information associated with the other data stored in the fourth public cache to the directory file stored in the first public cache; and
forwarding a calling card to the fourth node, the calling card to include location information for the first node and an indication that the first node has the directory file that includes the other information associated with the other data stored in the fourth public cache and, the information assigned to the data stored in the second public cache.

28. An apparatus, comprising:
a processor that executes or facilitates execution of computer-executable instructions to at least:
receive data at a first node coupled to a second node via a first peer-to-peer communication link, the data received from a data source located remote to both the first node and the second node;
store the data in a public cache of the first node, the public cache maintained in a portion of memory configured to be accessible to the second node via the first peer-to-peer communication link;
set a time-to-live timer for the data based, at least in part, on a life span value assigned to the data, wherein the life span value is determined based, at least in part, on an amount of time to download the data from the data source into the public cache;
receive a copy request from the second node to copy the data from the public cache of the first node;
in response to receipt of the copy request, determine a first location of the first node relative to a second location of the second node;
determine whether a change has occurred in the first location of the first node relative to the second location of the second node, and in response to a determination that the change has occurred in the first location of the first node relative to the second location of the second node, adjust the time-to-live timer; and
delete the data from the public cache of the first node upon expiration of the adjusted time-to-live timer.

29. The apparatus of claim 28, wherein the life span value assigned to the data is based, at least in part, on one of an available storage capacity in the public cache of the first node, an available bandwidth for the first node to couple to the second node via the first peer-to-peer communication link, or another amount of time the first node remains coupled to the second node via the first peer-to-peer communication link.

30. The apparatus of claim 28, wherein the data comprises at least one of a video file, an audio file, a multimedia file, or a data file.

31. The apparatus of claim 28, wherein the processor further executes or facilitates the execution of the computer-executable instructions to adjust the time-to-live timer to expire sooner in response to a determination that the change in the first location relative to the second location indicates that the first node has shifted away from a centralized location relative to the second node.

32. The apparatus of claim 28, wherein the processor further executes or facilitates the execution of the computer-executable instructions to adjust the time-to-live timer to expire later in response to a determination that the change in the first location relative to the second location indicates that the first node has shifted toward a centralized location relative to the second node.

33. A system, comprising:
a first node comprising a memory, the memory configured to include a first public cache accessible to other nodes coupled to the first node via one or more peer-to-peer communication links; and
a processor that executes or facilitates execution of computer-executable instructions to at least:
store a directory file in the first public cache, the directory file to include information associated with data stored in a second public cache of a second node, and a second location of the second node;
set a time-to-live timer for the directory file based, at least in part, on a life span value associated with the directory file, wherein the life span value is estimated based, at least in part, on an interval of time to download the directory file into the first public cache;
receive a directory request from a third node, the directory request to include a request for the information assigned to the data stored in the second public cache included in the directory file;
in response to receipt of the directory request, determine a first location of the first node relative to a third location of the third node;
determine whether a change has occurred in the first location of the first node relative to the third location of the third node, and in response to a determination that the change has occurred in the first location of the first node relative to the third location of the third node, adjust the time-to-live timer; and
delete the data from the public cache associated with the first node upon expiration of the time-to-live timer.

34. The system of claim 33, wherein the data stored in the second public cache includes a portion of the data received by the second node via a network communication link from a data source located remote to the first node, the second node, and the third node.

35. The system of claim 34, wherein the one or more peer-to-peer communication links include at least one of a wireless local access network communication link, a wired local access network communication link, a wireless wide area network communication link, a wired wide area network communication link, or a Bluetooth communication link, and wherein the network communication link via which the second node received the data from the data source includes the network communication link that communicatively couples the second node to the data source via Internet.

36. The system of claim 33, wherein the processor further executes or facilitates the execution of the computer-executable instructions to adjust the time-to-live timer to expire sooner in response to a determination that the change in the first location relative to the second location indicates that the first node has shifted away from a centralized location relative to the third node.

37. The system of claim 33, wherein the processor further executes or facilitates the execution of the computer-executable instructions to adjust the time-to-live timer to expire later in response to a determination that the change in the first location relative to the second location indicates that the first node has shifted toward a centralized location relative to the third node.

38. A computer program product comprising a non-transitory medium having instructions, which, when executed by logic, cause the logic to:
receive data at a first node coupled to a second node via a first peer-to-peer communication link, the data received from a data source located remote to both the first node and the second node;
store the data in a public cache of the first node, the public cache maintained in a portion of memory configured to be accessible to the second node via the first peer-to-peer communication link;
estimate a life span value based, at least in part, on a total amount of time to download the data from the data source into the public cache;
set a time-to-live timer for the data based, at least in part, on the life span value assigned to the data;
receive a copy request from the second node to copy the data from the public cache of the first node;
in response to receipt of the copy request, determine a first location of the first node relative to a second location of the second node;
determine whether a change has occurred in the first location of the first node relative to the second location of the second node, and in response to a determination that the change has occurred in the first location of the first node relative to the second location of the second node, adjust the time-to-live timer; and
delete the data from the public cache associated with the first node upon expiration of the time-to-live timer.

39. The computer program product of claim 38, wherein the life span value assigned to the data is based, at least in part, on one of an available storage capacity in the public cache of the first node, an available bandwidth for the first node to couple to the second node via the first peer-to-peer communication link, or another amount of time the first node remains coupled to the second node via the first peer-to-peer communication link.

40. The computer program product of claim 38, further comprising instructions to adjust the time-to-live timer to expire sooner in response to a determination that the change in the first location relative to the second location indicates that the first node has shifted away from a centralized location relative to the second node.

41. The computer program product of claim 38, further comprising instructions to adjust the time-to-live timer to expire later in response to a determination that the change in the first location relative to the second location indicates that the first node has shifted toward a centralized location relative to the second node.

42. The computer program product of claim 38, wherein the first peer-to-peer communication link includes at least one of a wireless local access network communication link, a wired local access network communication link, a wireless wide area network communication link, a wired wide area network communication link, or a Bluetooth communication link, and wherein the network communication link via which the node receives the data from the data source includes the network communication link that communicatively couples the node to the data source via Internet.

* * * * *

UNITED STATES PATENT AND TRADEMARK OFFICE
CERTIFICATE OF CORRECTION

PATENT NO. : 9,742,842 B2  
APPLICATION NO. : 13/511134  
DATED : August 22, 2017  
INVENTOR(S) : Roberts et al.

Page 1 of 1

It is certified that error appears in the above-identified patent and that said Letters Patent is hereby corrected as shown below:

In the Specification

In Column 1, Line 42, delete "link In" and insert -- link. In --, therefor.

In Column 4, Line 37, delete "link In" and insert -- link. In --, therefor.

In Column 16, Line 43, delete "link Instructions 904" and insert -- link. Instructions 904 --, therefor.

In the Claims

In Column 22, Line 23, in Claim 13, delete "link" and insert -- link, --, therefor.

Signed and Sealed this  
Eighth Day of May, 2018

Andrei Iancu  
*Director of the United States Patent and Trademark Office*